United States Patent
Kroll

[15] 3,699,747
[45] Oct. 24, 1972

[54] PROCESS FOR CLEANING FILTER ELEMENTS OF FABRIC FILTER EQUIPMENT

[72] Inventor: Gert Kroll, Bayernstrasse 18, Hosel/Dusseldorf, Germany

[22] Filed: Sept. 8, 1969

[21] Appl. No.: 855,946

[52] U.S. Cl. ..........................55/96, 55/302, 55/341
[51] Int. Cl. .............................................B01d 46/04
[58] Field of Search..................55/302, 303, 96, 341

[56] References Cited

UNITED STATES PATENTS

| | | | |
|---|---|---|---|
| 2,276,805 | 3/1942 | Tolman, Jr. ...................55/288 |
| 3,430,419 | 3/1969 | Reinecke et al. .............55/302 |
| 3,513,638 | 5/1970 | Young..........................55/302 |
| 1,784,339 | 12/1930 | Clasen et al. .................55/302 |
| 3,057,137 | 10/1962 | Perlis et al. ...................55/303 |
| 3,078,646 | 2/1963 | Leech et al. ..................55/303 |
| 3,385,033 | 5/1968 | Basore et al. .................55/302 |
| 3,209,521 | 10/1965 | Roujob..........................55/303 |
| 3,535,851 | 10/1970 | Riemsloh......................55/294 |

FOREIGN PATENTS OR APPLICATIONS 1,009,993    11/1965    Great Britain...............55/302

*Primary Examiner*—Bernard Nozick
*Attorney*—Malcolm W. Fraser

[57] ABSTRACT

A process and apparatus for cleaning the filter elements of a fabric filter equipment in which certain of the filter elements are recurrently shut off from the current dust-laden air, and at such time is exposed to the action of a clean air current under relatively higher pressure, thus causing the filter elements to move alternately in opposite directions. The apparatus includes intermittently rotatable valve means causing the filter elements to be subjected to suction for short times and alternately then to air under pressure for longer periods.

6 Claims, 4 Drawing Figures

PATENTED OCT 24 1972
3,699,747
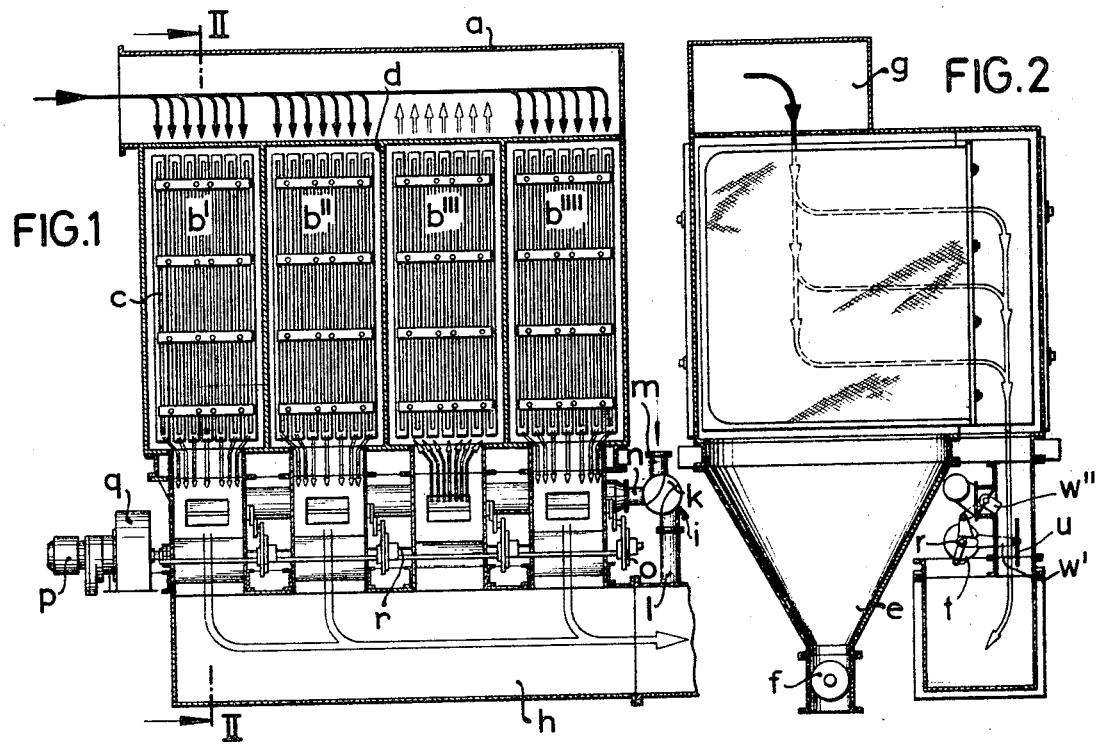
FIG. 1
FIG. 2
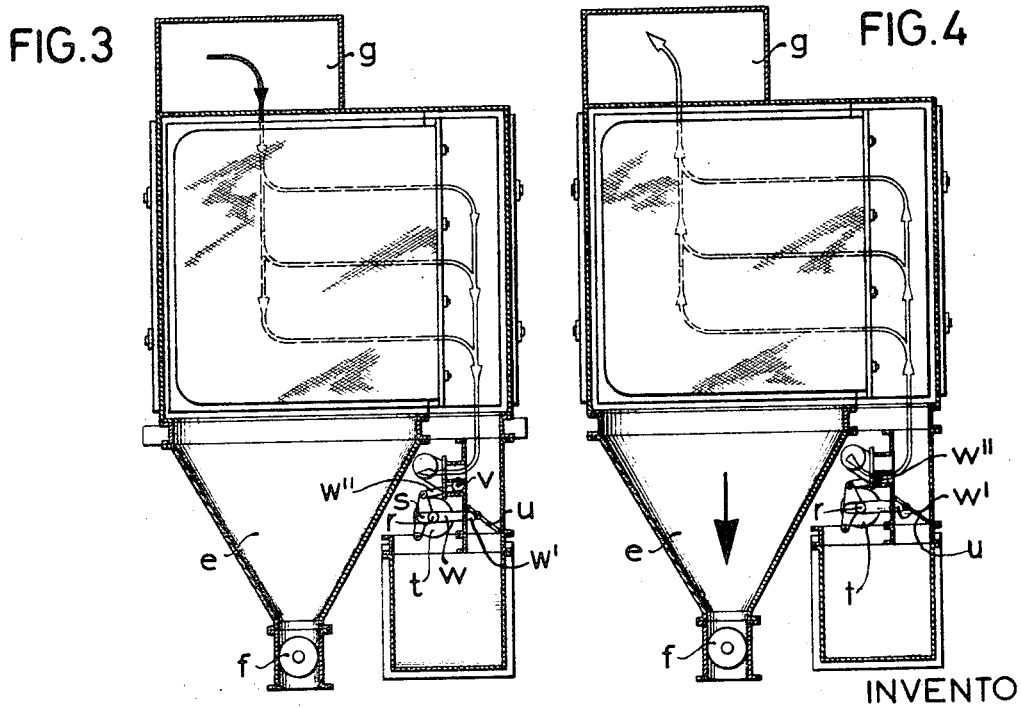
FIG. 3
FIG. 4
INVENTOR
Gert Kroll
by *Malcolm W. Fraser*
attorney 3,699,747

PROCESS FOR CLEANING FILTER ELEMENTS OF FABRIC FILTER EQUIPMENT

BACKGROUND OF THE INVENTION

The invention relates to a process for cleaning filter elements of fabric filter equipment, and, of course, of bag or hose filter equipment as well as of surface filter equipment, which is applicable for suction as well as for pressure filter equipment of this fundamental design, and to an apparatus suitable to its execution. It provides such a process which, in comparison with known procedures used up to now for the cleaning of the filter elements, is distinguished by the extraordinary simplicity of its execution as well as of the equipment necessary for it, and is characterized above all by the fact that the wear of the fabric element is considerably diminished, and its fully automatic method of working, if occasion arises, is adaptable to the most varied operating conditions coming into question.

With known fabric filter equipment the cleaning of the filter fabric results, after disconnection of the individual or of a group of filter elements, either in a purely mechanical way through shaking off or knocking off the layer of dust deposited on the fabric or by so-called back flushing, which means reversal of the air current flowing through the fabric, and blowing off the dust in this way.

The purely mechanical cleaning procedures result in intense wear of the fabric. With cleaning through flushing back, the fabrics are likewise mechanically strained, and moreover, especially in the case of dust with viscous, hygroscopic or easily crystallizing qualities, the desired cleaning is not obtained in sufficient measure, especially because the air which is flushed back does not flow through the entire fabric surface uniformly, but essentially flows through rapidly forming areas of preference, where it finds the least resistance.

The combination known in itself of the mechanical cleaning through knocking the dust off with flushing back leads indeed to a better and faster cleaning of the filter fabric, however, one must also allow for the disadvantage of rapid wear of the same.

SUMMARY OF THE INVENTION

With the process according to the invention all these disadvantages are avoided by having the cleaning phase carried out in this way: the filter elements, or group of such, during this phase are alternately shut off a great number of times from the dust-laden air current and are connected to a clean air stream being on the other hand under higher pressure, so that they are moved by these alternating pressure effects alternately in the one and the opposite direction, which has as a result a very fast falling off of the dust collected on their dust sides, whereby this action, in addition to being aided by the moving of the fabric, is supported by the following: through the action of the differential pressures, the dust particles still present are passed into new positions and because of this the formation of favored channels of passage is prevented.

In the case of the use of the new process for the cleaning of closed filter elements, such as pockets, tubes and the like, on a filter apparatus so equipped, under alternate action of the different pressures on the interior of these filter elements, there can be regulated the desired backward and forward motion of the walls of the same in especially advantageous ways through appropriate adjustment of the pressure ratios, increased so much that the walls lying opposite each other of the adjoining filter elements approach each other until striking together, so that then another purely mechanical knocking action is added to the alternating action of the air currents of different pressures.

The new process is, as has already been mentioned, as applicable to suction filter equipment as it is to pressure filter equipment, whereby in the first case in the phases of higher pressure action, there also occurs a resulting reversal of the direction of the air flowing through the fabric with the flushing back procedure, in the second case a different rate of flow through the fabric.

With its application for closed filter elements, the new process, according to the conditions present, which means according to the amount of dust being attacked and the quality of the dust being deposited, can by choice be so executed that in the interphases of the action of the higher pressure, the filter elements can be essentially merely alternately blown up or be subjected to an action of the clean air flowing through its pores.

It has proven especially useful in all cases to regulate as short as possible the phase of slight pressure during which dust-laden air flows to the fabric, in comparison to that of the effect of clean air under higher pressure, because the phase should effect merely the moving back of the fabric, which is after all led to by only a momentary action of the slight, relatively lower pressure.

In particular the new process is executed as follows: the filter element to be cleaned or a group of such elements are shut off in the cleaning phase for very short periods of time from the impact with dust-laden air and in longer inter-phases are connected to a clean air source of higher pressure, which means, in the case for example of the usual suction filter equipment, alternately to the exhaustor and to a scavenger air pipe respectively.

These change-over steps result in appropriate selectable chronological sequence through a motor-driven adjustment device, which in the usual cases of the cleaning of a number of groups of filter elements in an apparatus is so formed and works in such a way that in sequence a group of filter elements to be cleaned is intermittently joined alternately with the dust-laden air pipe — in the case of suction filter equipment to the exhaustor — and to the pipe for the supply of clean air which is under higher pressure.

Especially appropriate for the regulation of these change-over steps has proven to be a regulation device in the form of a three-way air cock with a drum controller continuously circulating in the cylindrical air cock body, whose shut-off zones alternately produce and shut-off the above mentioned pipe connections and which works together with a valve control through which the filter element to be cleaned is shut off one time from the clean air collecting chamber of the filter and at the same time connected to the clean air pipe, on the second time is shut off to the dust-laden air current and from the clean air current, whereby there can be regulated the frequency of this change-over process through adjustment of the rotational speed of the driving motor, and the duration of the individual phases, through corresponding formation of the drum controller, according to the conditions of the individual case. The amounts of air flowing in both phases can be regulated by throttle valves superposed on this regulating device.

With this entire arrangement there can moreover be combined a device for measuring the dust content at the time of the dust-laden air and/or the reduction of the permeability of the fabric by the removed dust, which in its turn regulates, through the rotational speed of the driving motor, the interval between the change-over processes from the one to the succeeding group of filter elements.

The scope of the invention is not avoided, if found, in especially difficult cases, in addition to the use of the new process other mechanical means for knocking the filter element is employed.

BRIEF DESCRIPTION OF THE DRAWINGS

FIG. 1 shows schematically in axial vertical section, with the omission of all details not necessary for the understanding of the invention, a pocket filter apparatus with the features of the invention in its position of operation.

FIG. 2 is a section along the line II—II of FIG. 1 and shows a filter element as well as the regulating device for the change-over steps in the normal position of operation of the parts of the same.

FIG. 3 shows a view similar to FIG. 2 and in which the clean air valve is closed and the scavenging air valve is open.

FIG. 4 shows a view similar to FIG. 3 the equipment in the position of the regulating device in the phase of the supplying clean air under higher pressure.

DESCRIPTION OF THE PREFERRED EMBODIMENT

The suction filter installation, shown in the drawings by way of example, consists according to the embodiment by way of example of four filter chambers $b'$, $b''$, $b'''$, $b''''$, disposed in a common housing $a$, each of said chambers containing a plurality of filter pockets $c$.

The individual filter chambers are separated from one another by means of separating or dividing walls $d$ and discharge below into a funnel-shaped dust collection chamber $e$ extending over the entire length of the installation, and in the bottom or floor area of this dust collection chamber passes a worm $f$ for carrying off the dust.

Above the chambers is arranged a feed channel $g$ connected with them for the dust-containing air. In FIG. 1 it is illustrated by means of the solid line arrows that in the phase shown, the chambers $b'$, $b''$, $b''''$ are in normal condition of operation, that is, the filter elements are attached to the pure air channel $h$ leading to the exhaustor, not shown, while the chamber $b'''$ carries out the purification phase, whereby, in the drawing the intermediary phase is shown, in which this chamber is flowed through by the scavenging air in direction of the arrows not in solid lines, said scavenging air being supplied by a blower, not shown.

The control device for the carrying out of the reversing steps consists of the combination of a three-way cock generally designated at $i$, whose closure member according to the embodiment by way of example, is formed by means of a widened plate body $k$ closing at its end surfaces the connecting channels at times rotating at both of its end surfaces up to above the cross-section of the connected channels — of the channel $l$ leading to the exhaustor or pure-air-outlet of the return of scavenging-air-feed-channel $m$ and of the channel $n$ for the scavenging air.

The step by step action of this plate-body $k$ and with it the intermittent actuation of the flap or valve connection is controlled by the mechanism generally indicated at $o$. This flap or valve connection like all the others, each correlated with the individual filter chambers $b'$, $b''$, $b'''$, $b''''$ and therewith change-over devices are actuated by a motor $p$ with preferably changeable number of revolutions, to which is connected a Geneva movement $q$ over which the slow intermittent rotation of the common shaft $r$ takes place. This shaft $r$, as apparent from FIGS. 2 to 4, extends to each of these valve or flap connections through a slot $s$ of a lever $w$ seated on a cam plate $t$, the one arm of said lever being connected and cooperating with the valve $u$ for the closure of the pure-air-channel and its other arm being connected and cooperating with the valve $v$ for the closure of the scavenging air channel, in such manner, that through its rotation from the position shown in FIG. 2, in which the pure air valve $u$ is open and the scavenging air valve $v$ is closed, — to the position according to FIG. 3, — in which the flow between the pure gas portion and the pure gas collection chamber is interrupted and guided over the control roller, and finally is brought into the position shown in FIG. 4, in which the pure air valve $u$ closes the pure air channel and the scavenging air valve $v$ releases the scavenging air channel, simultaneously the corresponding inclination of the closure member $k$ is effected. These movements of the lever $w$ are carried out by means of the cams of the camplate $t$ which is rotated stepwise by means of the maltese-cross-Geneva-movement, — are transferred by means of the lever rods $w'$ or $w''$, respectively, hinged to the pure-air-cutoff-valve $u$ or the scavenging air-cutoff-valve $v$, respectively, at the ends of the lever $w$. The cams of the cam-plate or -disc correlated with the different compartments $b'$, $b''$, $b'''$ and $b''''$ of the filter are offset to one another in such manner, that the reliable sequence of the connection and disconnection of the purification phase results for the individual chambers.

The different positions which these valves and therewith the control device $i$, assume in the different phases and which are revealed in detail in FIGS. 3 and 4, require hereinafter no further explanation.

The possibility of connecting throttle valves in series with the actual valves in order to control the quantity of air, is well known in the art.

From FIGS. 2 to 4, the path which the dust-laden air assumes in the individual phases, to the pure-air-conduit and the scavenging air assumes upon cut off dust-laden air, is apparent without further explanation. From the foregoing, it will be understood that the flow of scavenging air through the fabric filter pocket is greater during the intervals in which the reversely-going scavenging air flows than during the intervals in which the forwardly-going scavenging air flows, and the intervals for the reversely-going scavenging air are longer than the forwardly-going ones.

Naturally the invention is not limited to the embodiment described in detail in the foregoing and illustrated in the drawings, but changes with respect to the same are possible to the most varied extent, without departing from the basic idea.

What I claim is:

1. The method of removing dust from a flexible fabric filter pocket, wherein during normal filtration dust-laden air is fed to one side of the fabric filter pocket and filtered air is exhausted from the other side of the fabric filter pocket so that the air, in being filtered, flows through the fabric in one direction, said method comprising, periodically interrupting the filtration for predetermined intervals, feeding scavenging air through the fabric filter pocket during said intervals for a series of periods alternately in said one direction and then in the opposite direction, and controlling the flow of the scavenging air through the filter pocket so that it is greater during the periods of flow in said opposite direction than in said one direction.

2. The method as recited in claim 1, and controlling the lengths of said intervals of scavenging air flow so that the intervals of air flow in said opposite direction are longer than those in said one direction.

3. The method as recited in claim 1, and controlling the relative pressures of the scavenging air flows through the fabric filter pocket so that they are greater during the periods of flow in said opposite direction than in said one direction.

4. The method of removing dust from a flexible fabric filter pocket, wherein during normal filtration dust-laden air is fed to the outer side of the fabric filter pocket and filtered air is exhausted from the inner side of the fabric filter pocket so that the air, in being filtered, flows through the fabric from the outside in, said method comprising, periodically interrupting the filtration for predetermined intervals, feeding scavenging air through the fabric filter pocket during said intervals for a series of periods alternately from the outside in and then from the inside out, and controlling the flow of the scavenging air through the filter pocket so that it is greater during the periods of flow from the inside out than from the outside in.

5. The method recited in claim 4, and controlling the periods of flow of scavenging air so that the periods of flow from the inside out are longer than from the outside in.

6. The method recited in claim 4, and controlling the pressures of the scavenging air flows through the filter pocket so that they are greater during the periods of flow from inside out than from outside in.

* * * * *